Jan. 14, 1969 M. N. MANSOUR 3,421,380
INTERMITTENT MOTION APPARATUS
Filed June 7, 1967
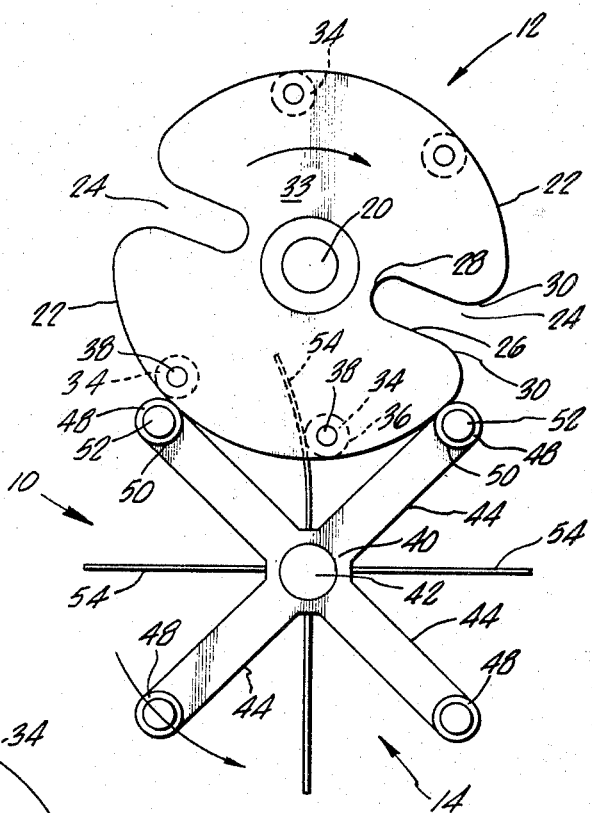
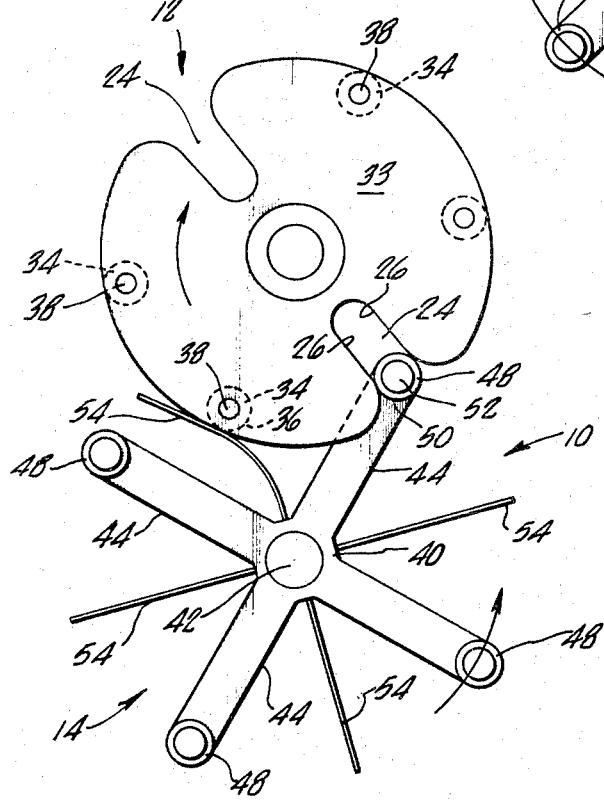
INVENTOR.
MOMTAZ NOSSHI MANSOUR
BY
ATTORNEYS

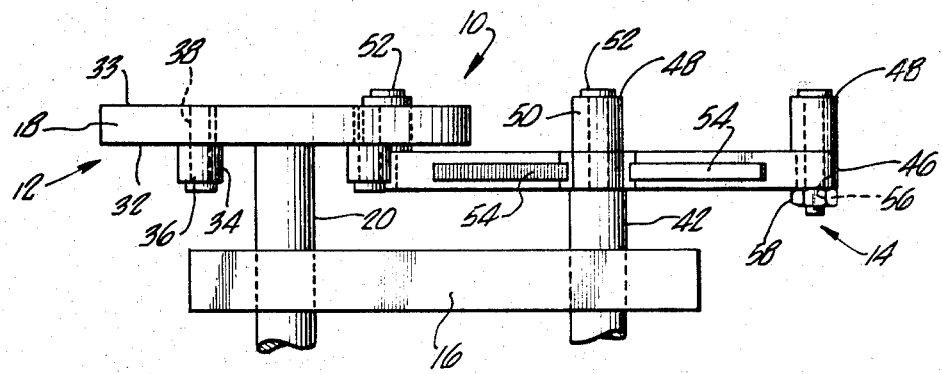
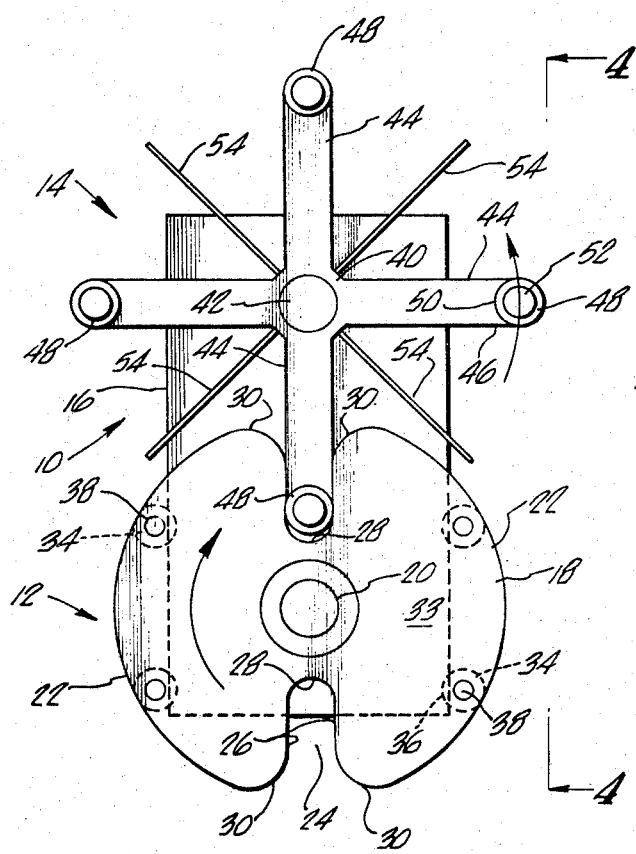

United States Patent Office 3,421,380
Patented Jan. 14, 1969

3,421,380
INTERMITTENT MOTION APPARATUS
Momtaz Nosshi Mansour, Duarte, Calif., assignor to Unitek Corporation, Monrovia, Calif., a corporation of California
Filed June 7, 1967, Ser. No. 644,200
U.S. Cl. 74—84                                12 Claims
Int. Cl. F16h 27/08; F16h 55/04

ABSTRACT OF THE DISCLOSURE

Apparatus having a driving member defining an indentation and an arcuate surface concentric with its axis. A driven member is mounted on an axis laterally spaced from that of the driving member and has means for engaging the arcuate surface and the indentation. The driven member is spring biased in the direction of rotation imparted to it by the driving member.

BACKGROUND OF THE INVENTION

Field of the invention

This invention relates to apparatus for transforming continuous rotating motion into an intermittent rotating motion.

State of the prior art

Apparatus for transforming a rotating motion of a drive member into an intermittently rotating motion of the driven member have long been employed, common examples of it being a Geneva wheel drive or a cam-race arrangement as the one shown on page 70 of "Ingenious Mechanics for Designers and Inventors," volume 1, published by the Industrial Press of New York 13, N.Y. All these arrangements work on a common principle. They provide two members, one being the driving one and the other one being the driven one. One of the members includes an indentation or notch and the other a protrusion, such as a pin, which is capable of engaging the indentation. The driving member thereby rotates the driven member through a portion of a complete revolution. During the remainder of the time the driven member is stationary and is in one manner or another secured to an arcuate surface of the driving member, which prevents rotational movements of the driven member before another slot engages another pin and rotationally advances the driven member another increment.

All of these arrangements are not without problems. More particularly, all arrangements require the component parts to be machined with the highest degree of accuracy. Moreover, a substantial amount of friction is created while the driving member rotates and the driven member is maintained stationary. Such drives are not suitable for high-speed operation because often excessive amounts of heat generated by the friction between the components tend to bind and cause wear of parts moving relative to each other if they are machined to close tolerances. If the parts are machined such that there is some play between the moving parts to allow for heat expansion and to keep manufacturing costs within reasonable limits, inaccuracies in the movements result. Backlash, a result of loosely machined parts, permits the driven member to move relative to the driving member in a direction opposite to the movements of the driving member and the movement that member imports upon the driven member. In many applications, particularly in assembly machines, backlash is highly undesirable and might improperly position or damage one of the workpieces which the apparatus assembles. Backlash further creates oscillating movements between the members when they are subjected to shock or vibrations, especially in high-speed operations, which leads to metal fatigue in the members and ultimate failure of them.

Particularly in Geneva wheel drives, the loads or torque which can be transmitted from the driving member to the driven member are limited. During the changeover driving portion of a cycle, when the pin secured to a first member disengages the slot in the other member and a convex arcuate surface of the first member engages a mating concave arcuate surface in the other member, the leading edge of the convex arcuate surfaces is subjected to theoretically infinitely high stresses. Thus, the leading edge can become damaged after short periods of operation if the drive is subjected to high torques. This, in turn, leads to inaccuracies in the drive and requires the replacement of the damaged part. In addition, structural characteristics of a Geneva wheel are such that it does not lend itself to the transmission of high torques. If high torques are to be transmitted, the Geneva wheel becomes large and heavy to prevent it from failing under high stresses.

The replacement of worn parts, a relatively frequent occurrence in all presently available drives for transforming rotating motion into an intermittent rotating motion, is difficult and costly because each set of driving and driven members must be individually matched. Thus, after one of the members has become worn, its replacement is often difficult or impossible since it is not possible to procure an adequately matched replacement part. The replacement of one of the parts might therefore necessitate the replacement of all parts when no suitable replacement is available.

SUMMARY OF THE INVENTION

Briefly, this invention provides apparatus for transforming rotating motion into an intermittent rotating motion, and includes support means for mounting a driving member rotatably about a first axis, the driving member having a circularly arcuate surface substantially concentric with and parallel to the first axis. The driving member includes an indentation radially extending toward the first axis from the arcuate surface. A driven member is mounted in the support means to be rotatable about a second axis which is laterally spaced from and substantially parallel to the first axis. It includes at least three elongated arms which radially extend from the second axis. Engaging means are secured to ends of each arm remote from the second axis and extend away from the arms in a direction substantially parallel to the second axis for engaging the arcuate surface and the indentation of the driving member. The engaging means are preferably rotatable relative to the driven member. Spring means are included for biasing the driven member in a rotational direction corresponding to the direction of rotation imparted to the driven member by the driving member.

The spring means preferably are leaf springs connected with the driven member and extending radially away from the second axis. They are disposed intermediate each pair of adjacent arms, the leaf springs being axially offset from the driving member such that they cannot contact the arcuate surface. The springs engage means secured to the driving member and extending therefrom in a direction substantially parallel to the first axis. When the driving member rotates relative to the driven member, the leaf springs bias one of the cylindrical means, which are preferably rotatable relative to the driven member, into engagement with the arcuate surface and the indentation.

A rotational movement is imparted upon the driven member when the cylindrical means are in engagement with the indentation in the driving member. After the engaging means, and with it the driven member, are rotated by the driving member over a predetermined angle, the engaging means disengage the indentation and again engage the arcuate surface of the driving member. At the same time, the engaging means secured to a second of the plurality of arms of the driven member is in engagement with the arcuate surface of the driving member. While the engaging means are thus in engagement with the arcuate surface, the driven member is stationary relative to the driving member. The leaf spring biases the driven member in the direction of its rotation imparted by the driving member and the second arm together with its engaging means enters the indentation of the driving member when the indentation is adjacent that engaging means. Thereafter, an additional incremental rotational movement is imparted to the driven member.

This intermittent drive apparatus is capable of operating at high speeds as compared to a Geneva drive, for example. All parts moving relative to each other can be subjected to rolling friction only, thereby reducing frictional wear of the parts. The generation of large amounts of heat, even at high speeds, is thereby substantially reduced. The necessity of having to replace parts that become worn is thereby also substantially reduced. Moreover, there is no change-over in the relative movements between the driving and the driven member as is the case with Geneva drives. High stress concentration at instances where the engaging means or the drive pin leaves the indentation and the driven member becomes stationary while the driving member continues its rotating motion, is therefore no longer present.

The leaf springs can be given any desired degree of stiffness and they are constructed such that the one in engagement with the driving member carries a substantial portion of the load, while it maintains a positive engagement between the arm adjacent the arcuate surface and the arcuate surface. Vibrations, or shock, which are frequently encountered in high-speed operations, therefore do not detract from the accuracy and proper operation of the apparatus.

BRIEF DESCRIPTION OF THE DRAWINGS

FIG. 1 is a plan view of an apparatus for transforming a rotating motion into an incrementally rotary motion constructed according to the present invention;

FIG. 2 is a plan view similar to FIG. 1, but wherein an arm of the driven member is partially engaged by the indentation in the driving member;

FIG. 3 is a plan view similar to FIG. 1, but wherein an arm of the driven member is fully engaged by the indentation in the driving member; and FIG. 4 is an elevational view of the apparatus of this invention taken along lines 4—4 of FIG. 3.

DESCRIPTION OF THE PREFERRED EMBODIMENT

Initially referring to FIGS. 3 and 4 an apparatus 10 for transforming a rotating motion of a driving member 12 into an incremental or intermittent rotating motion of a driven member 14 is shown mounted in a support 16. The support is a component of any suitable apparatus (not shown) in conjunction with which the intermittent apparatus 10 is used.

The driving member 12 is preferably a disc 18 which is rotatable about a first axis defined by a first shaft 20 suitably journalled in the support 16 and to which the disc is secured. The disc defines a circularly arcuate surface 22 which is concentric with and parallel to the first axis and which is provided with one or more indentations or notches 24 extending from the arcuate surface radially towards the first axis. In the embodiment shown in FIG. 3, the indentations are defined by a pair of substantially parallel side walls 26 extending from the arcuate surface towards shaft 20. A bottom 28, which is preferably arcuate, defines an inner end of the indentation. A transitional section 30 is convex and joins the side walls 26 with the arcuate surface 22 of the disc. To facilitate the manufacture of the disc the transitional section 30 is preferably arcuate and defined by a radius.

The disc 18 includes substantially parallel faces 32 and 33 which are transverse to the first axis. A plurality of rollers 34 are rotatably mounted on face 32. The rollers are positioned adjacent and inwardly of the arcuate surface 22 of the disc, and have a cylindrical periphery 36. They are rotatable about shafts 38 which are secured to the disc and which have axes substantially parallel to the first axis.

The driven member 14 defines a hub 40 and is rotatable about a second axis defined by a second shaft 42 which is mounted in support 16, which second axis is laterally spaced from and substantially parallel to the first axis. A plurality of at least three elongated arms 44 extends radially outward from the second axis and the hub 40. Each of ends 46 of the arms remote from the second axis is provided with a roller 48 having a cylindrical periphery 50 and which are rotatable about shafts 52 suitably secured to the outer ends of the arms. The roller has a diameter which is less than the width of indentation 24 intermediate sides 26 to permit the roller to enter the indentation. The shafts have axes which are substantially parallel to and equidistant from the second axis defined by the second shaft 42. Additionally, the axes of the shafts 52 are equally spaced on an imaginary circle having the second axis as its origin and passing through all axes of the shafts 52.

The distance between the second axis and the axis of each shaft 52 is greater than the distance between the second axis and the arcuate surface 22 of disc 18. When one of the arms 44 is longitudinally aligned with a line intersecting both the first and the second axis, the axis of shaft 52 mounted on the end 46 of that arm then protrudes beyond the arcuate surface 22 of the disc and into indentation 24 if the indentation 24 is likewise aligned with said line.

Referring now to FIG. 4, at least the portion of arms 44 adjacent the ends 46 but preferably the whole of each arm of the driven member 14 is axially spaced from the driving member 12 such that they lie below the plane defined by the lower face 32 of the disc 18. The arms thereby do not interfere with the disc when they are rotated about the second axis. Shafts 52 and the rollers 48 mounted thereon extend upwardly and protrude beyond the plane defined by the lower face 32 of the disc. Preferably they are of a length sufficient to also protrude beyond the upper face 33 of the disc.

Secured to the hub intermediate each adjacent pair of arms 46 is a leaf spring 54 which extends radially outward from the second axis. Thus, there is a plurality of leaf springs which equals the plurality of arms 46. The inner ends of the leaf springs are suitably secured to a portion of hub 40 intermediate each adjacent pair of arms. They can be secured thereto in any convenient manner such as by clamping them (not shown), bonding them, or by anchoring them into the hub when the hub and the arms are cast. The springs are of sufficient length that one spring engages one of the rollers 34 rotatably secured to the lower face 32 of disc 18 until one of the rollers 48 secured to the end 46 of one of the arms 44 is in engagement with the parallel side walls 26 of notch 24 (the position shown in FIG. 2).

The apparatus 10 operates in the following manner. In an original position, shown in FIG. 1, a pair of rollers 48 is adjacent the arcuate surface 22 of disc 18. The disc rotates in a clockwise direction as indicated by the arrow in FIG. 1. While the rollers so engage the arcuate surface and the disc 18 rotates, the driven member 14 remains stationary relative to the driving member 12. In this position, which is just before the right-hand arm of the driven member in engagement with the arcuate surface is about to engage the transitional section 30 of the disc, the leaf spring 54 intermediate the first and second axis is in engagement with one of the rollers 34 secured to face 32 of the disc. The leaf spring is deflected by that roller 34 and biases the driven member in the rotational direction imparted to the driven member by the driving member. In other words, in the arrangement shown in FIG. 1, it biases the driven member 14 in a counterclockwise direction.

The second of the two rollers 34 shown adjacent the driven member 12 in FIG. 1 is positioned, and the leaf spring is of a sufficient length such that at the point at which the leaf spring 54 disengages from that second roller 34 (which position is not shown in the drawings), it immediately engages the roller 34 with which it is shown in engagement in FIG. 1. The driven member 14 is thereby constantly biased in a counterclockwise direction and roller 48 secured to the right-hand arm 44 is biased into constant engagement with the arcuate surface 22 of the driving member 12.

The continued clockwise rotation of disc 18 engages the right-hand roller 48 of the driven member 14 adjacent the arcuate surface with the convex transitional section 30 intermediate the arcuate surface and side walls 26 of indentation 24. The instant that roller 48 is in engagement with the transitional section, the driven member begins to rotate in a counterclockwise direction under the biasing force exerted upon it by leaf spring 54 in engagement with one of the rollers 34. The spring force continues to rotate the driven member in a counterclockwise direction as the disc 18 rotates clockwisely until arm 44 is fully engaged between the parallel side walls 26 of indentation 24, as shown in FIG. 2. The leaf spring continues to transmit a rotational force from the driving member onto the driven member but it disengages the roller 34 after the driving member rotates an additional amount. When indentation 24, together with the elongated arm 44 it engages, is substantially aligned with the line intersecting both the first and second axes of the apparatus, all leaf springs 54 are disengaged from roller 34 on the driving member 12. This position is shown in FIG. 3. Any rotating motion is transmitted from the driving member 12 to the driven member 14 solely through the side walls 26 of indentation 24 and the roller 48 and the corresponding arm 44 of the driven member.

The continuing rotating motion of the driving member 12 rotates the driven member 14 until roller 48 in engagement with indentation 24 approaches the other transitional section 30 intermediate the other side wall 26 of the indentation 24 and the arcuate surface 22. At that position, which is similar to the position shown in FIG. 2 but wherein indentation 24 is positioned to the left-hand side of the first and second axes, another leaf spring 54 is in engagement with another roller 34 secured to disc 18 and again biases the driven member in a counterclockwise direction. A portion of the torque transferred between the driving and the driven members 12 and 14 is thereby being transmitted through another leaf spring 54 which now engages another roller 34. The rotating motion of the driven member continues until the third arm 44 disposed to the left (FIG. 3) of the arm 44 in engagement with indentation 24, engages the arcuate surface 22 of the disc. In that position, which is similar to the position shown in FIG. 1, the arm and roller which have been engaged by an indentation 24 during the preceding rotational motion of the driven member as well as the third arm and rollers 44 and 48 are both positioned adjacent the arcuate surface 22. The rotational motion of the driven member is terminated until the third arm and roller are about to engage an indentation 24 approaching it. The just described cycle is then repeated and the driven member 14 is rotated an additional amount. The direction of rotation of the driving member can be reversed and it can be rotated counterclockwisely without affecting the operation of this apparatus.

While the driven member 14 is stationary relative to the driving member 12, that is when two of the rollers 48 are adjacent the arcuate surface 22, the relative movement between the driven member and the driving member is translated into a rolling movement between the arcuate surface 22 and the cylindrical periphery 50 of the rollers 48. At the same time, the relative movements between the leaf spring 54 and roller 34 secured to the disc 18 is translated into a rotational movement by the cylindrical periphery 36 of roller 34. All relative movements between the two members are therefore rolling rather than sliding movements. This, of course, substantially reduces wear between the members and the generation of heat if the apparatus 10 is operated at a high speed. Substantially longer service life is thereby assured.

To avoid the necessity of having to construct the apparatus in matched pairs or to have to construct the center distances between the first and second axes with a high degree of accuracy, the shafts 52 which mount rollers 48 onto arms 44 of the driven member 14 are preferably mounted in oversized holes 56, which holes may be elongated slots extending in a direction substantially radial to the second axis. The shafts 52 are then secured to the ends 46 of the arms by means of a nut 58. The center distances between the first and second axis are then not critical and they can be constructed relatively inaccurate. When the apparatus 10 is installed in the support 16, the rollers 48 together with shafts 52 are adjusted to eliminate any play between the driving and driven members 12 and 14. Thus, manufacturing costs for the apparatus are substantially reduced because it is no longer necessary to maintain close tolerances, since a part manufactured to close tolerances not only requires expensive machinery but also entails a relatively large percentage of parts that must be rejected. In addition, even if one of the parts becomes worn, the apparatus can be adjusted to take up play and backlash generated thereby and the need for having to replace a component part of apparatus 10 is further postponed.

To assure the least amount of friction in the apparatus 10, rollers 34 and 48 are preferably mounted on ball or roller bearings. This assures a minimum dissipation of energy within apparatus 10 and further prolongs the life of its component parts since roller or ball bearings generally have a much longer service life than conventional bearings. For applications where the degree of accuracy and the speed of operation is relatively low, the rollers can of course be constructed in the form of stationary pins (not shown), which have a cylindrical periphery, but which do not rotate relative to their mounting surface, whereby they slidably engage the mating moving surfaces.

Apparatus 10 of this invention can be constructed to adapt it for all applications commonly encountered. It is capable of transmitting relatively high torques at high operating speeds. In such instances the rollers 34 and 48 preferably include ball or roller bearings selected according to well known and widely practiced methods for the proper selection of bearings such that they resist any wear even under severe operating conditions.

The springs 54 are constructed to maintain the trailing arm and rollers 44 and 48 in the direction of the rotational movement and which is disposed adjacent the arcuate surface 22 in secure and constant engagement with that surface. Additionally, it is given a sufficient amount of stiffness to transmit a substantial portion of the torque transmitted between the driving and the driven member from the driving member to the driven member.

High stress concentrations in leading edges of the drive member, as commonly encountered in Geneva wheel drives, are substantially avoided since no changeover motions between the engaging parts take place. From the instant a roller 48 enters indentation 24 until it leaves the indentation, the relative movement of the roller, the arcuate surface 22 and the indentation is continuous. The service life of the apparatus is thereby substantially enhanced.

What is claimed is:

1. Apparatus for transforming rotating motion into an intermittent rotating motion, comprising:
   support means;
   a driving member mounted on the support means to be rotatable about a first axis, the driving member having an arcuate surface and an indentation radially extending toward the first axis from the arcuate surface;
   a driven member mounted in the support means to be rotatable about a second axis laterally spaced from and substantially parallel to the first axis, the driven member comprising at least three elongated arms radially extending from the second axis;
   engaging means secured to ends of each arm remote from the second axis and extending away from the arms in a direction substantially parallel to the second axis for engaging the arcuate surface and the indentation, the engaging means being adapted to engage the indentation; and
   biasing means for urging the driven member in a rotational direction corresponding to the direction of rotation imparted to the driven member by the driving member.

2. Apparatus according to claim 1 wherein the engaging means includes a roller rotatably mounted on a shaft and wherein at least portions of the arms are axially off-set from the driving member such that the arms do not contact the driving member when the driven member rotates about its axis.

3. Apparatus according to claim 1 wherein the biasing means includes a leaf spring connected with the driven member and extending radially away from the second axis intermediate each pair of adjacent arms, the leaf springs being axially off-set from the driving member such that they can not contact the arcuate surface.

4. Apparatus according to claim 3 wherein the biasing means includes means secured to the driving member and extending therefrom in a direction substantially parallel to the first axis for engaging a leaf spring.

5. Apparatus according to claim 4 wherein the means for engaging a leaf spring includes a roller having a periphery for engaging the leaf spring.

6. Apparatus according to claim 5 wherein a transitional section of the driving member intermediate the arcuate surface and the indentation is convex.

7. Apparatus for transforming motion into an intermittent rotating motion, the apparatus comprising:
   support means;
   a driving member mounted in the support means to be rotatable about a first axis, the driving member having a circular arcuate surface substantially concentric with and parallel to the first axis and an indentation radially extending toward the first axis from the arcuate surface;
   a driven member mounted in the support means to be rotatable about a second axis laterally spaced from and substantially parallel to the first axis;
   at least three rollers rotatably secured to the driven member and equidistantly spaced from the second axis and from each other, the rollers being rotatable about third axes substantially parallel to the second axis and positioned to engage the arcuate surface and the indentation;
   a plurality of protrusions secured to the driving member and extending from the driving member in a direction substantially parallel to the first axis; and
   a leaf spring disposed between each adjacent pair of rollers and extending away from the second axis, the leaf springs being connected with the driven member and of a sufficient length and positioned such that a spring is engaged by one of the protrusions whenever at least one roller engages the arcuate surface.

8. Apparatus according to claim 7 wherein the rollers are mounted on shafts extending through apertures in the driven member, the apertures having a configuration permitting relative movements between the shaft and the driven member and including means to secure the shaft to the driven member.

9. Apparatus according to claim 8 wherein the protrusions include a roller rotatable about an axis substantially parallel to the first axis and having a periphery for engaging the spring.

10. Apparatus according to claim 9 wherein the driven member comprises a plurality of arms extending outwardly from the second axis and wherein the plurality of rollers is secured to ends of the arms remote from the second axis, and wherein at least portions of the arms are axially offset from the driving member such that the arms do not contact the driving member when the driven member rotates about its axis.

11. Apparatus according to claim 10 wherein the indentation is defined by a pair of substantially parallel sides extending from the arcuate surface toward the first axis, the parallel side being spaced apart a distance greater than a diameter of the roller.

12. Apparatus according to claim 11 including a convex transitional section intermediate a side of the indentation and the arcuate surface.

References Cited

UNITED STATES PATENTS

| 2,986,949 | 6/1961 | Lancaster et al. | 74—84 |
| 3,057,215 | 10/1962 | Stewart | 74—84 X |
| 3,170,333 | 2/1965 | Umbricht | 74—84 |

FOREIGN PATENTS 557,064  11/1943  Great Britain.

MILTON KAUFMAN, *Primary Examiner.*

U.S. Cl. X.R.

74—436